(12) United States Patent
Cherewyk

(10) Patent No.: US 9,845,897 B2
(45) Date of Patent: Dec. 19, 2017

(54) BONNET AND GATE ARRANGEMENTS FOR A GATE VALVE IN PARTICULATE-LADEN FLUID ENVIRONMENTS

(71) Applicant: ISOLATION EQUIPMENT SERVICES INC., Red Deer (CA)

(72) Inventor: Boris (Bruce) P. Cherewyk, Calgary (CA)

(73) Assignee: Isolation Equipment Services, Inc., Calgary (CA)

( * ) Notice: Subject to any disclaimer, the term of this patent is extended or adjusted under 35 U.S.C. 154(b) by 0 days.

(21) Appl. No.: 15/050,274

(22) Filed: Feb. 22, 2016

(65) Prior Publication Data

US 2016/0245420 A1    Aug. 25, 2016

Related U.S. Application Data

(60) Provisional application No. 62/118,931, filed on Feb. 20, 2015.

(51) Int. Cl.
| | | |
|---|---|---|
| F16K 27/04 | (2006.01) | |
| F16K 41/02 | (2006.01) | |
| E21B 34/02 | (2006.01) | |

(52) U.S. Cl.
CPC ............ *F16K 27/044* (2013.01); *F16K 41/02* (2013.01); *E21B 34/02* (2013.01); *Y10T 137/6072* (2015.04)

(58) Field of Classification Search
CPC ........ F16K 27/044; F16K 41/02; F16K 27/04; E21B 34/02; Y10T 137/6069; Y10T 137/6072; Y10T 137/6075

USPC .............................. 251/214, 326–330, 284; 137/315.28–315.3
See application file for complete search history.

(56) References Cited

U.S. PATENT DOCUMENTS

| | | | |
|---|---|---|---|
| 2,780,233 A | | 2/1957 | Volpin |
| 3,412,750 A | * | 11/1968 | Volpin ................. F16K 43/008 251/330 |
| 4,149,558 A | * | 4/1979 | McGee ................... F16K 41/14 137/315.28 |
| 4,245,661 A | | 1/1981 | McGee |
| 4,272,055 A | * | 6/1981 | Herd ...................... F16K 41/14 251/330 |
| 4,289,157 A | * | 9/1981 | McGee ................ F16K 17/383 251/214 |
| 4,364,543 A | * | 12/1982 | Soya ...................... F16K 31/50 251/330 |
| 4,568,062 A | * | 2/1986 | Regitz .................. F16K 3/0236 251/328 |

(Continued)

OTHER PUBLICATIONS

Canadian Requisition for CA 2,921,588 dated Dec. 12, 2016.

*Primary Examiner* — John Bastianelli
(74) *Attorney, Agent, or Firm* — Parlee McLaws LLP (CGY); Sean Goodwin

(57) ABSTRACT

A bonnet for a gate valve is provided or retrofitted for minimizing sand-packing and minimizing interruption of operations. An annular recess is formed about the stem, the resulting profile and dimensional modification effective to minimize packing effects when stroking the gate to the retracted position. In an embodiment, the annular recess is one or more of a cylindrical or conical recess. In another embodiment, wherein a retracted gate stops against the bonnet, one or both of the bonnet and gate interface is fit with beveled surfaces for receiving sand that accumulated on the stop.

11 Claims, 13 Drawing Sheets

(56) References Cited

U.S. PATENT DOCUMENTS

| | | | | |
|---|---|---|---|---|
| 4,570,659 A | * | 2/1986 | Karr, Jr. | F16K 17/383 251/330 |
| 5,732,731 A | * | 3/1998 | Wafer | F16K 41/023 137/315.28 |
| 2011/0140027 A1 | | 6/2011 | Parks | |

* cited by examiner

BONNET AND GATE ARRANGEMENTS FOR A GATE VALVE IN PARTICULATE-LADEN FLUID ENVIRONMENTS

FIELD

Embodiments disclosed herein generally relate to gate valves, and more particularly relate to bonnet and gate arrangements for valves used in fluid environments containing particulates such as sand.

BACKGROUND

In the field of fluid conveyance, particularly piping fit with valves, fluids containing particulate matter can result in accumulations or sand-packing that eventually interferes with valve operation. For example, in the industry of oil well completion, stimulation, operation and servicing, particulates introduced to the wellbore or solids flowing from the wellbore can infiltrate, build up, or otherwise interfere with the operation of the valve stem, the gate, and other moving components required for valve operation.

In the practice of fracturing or otherwise stimulating a subterranean formation, accessed by a wellbore, fluid-solid mixtures of fracturing fluids and large amounts of abrasive are often pumped down the wellbore to the wellbore formation by high pressure pumps. The wellhead and related structure are fit with isolation valves. Abrasives in the fracturing fluids include particulate matter such as proppants, often provided in the form of resin and sand. Herein, the particulates are referred to generically as sand for simplicity. A frachead directs the fracturing fluid and sand therein through a wellhead and down the wellbore. The fracturing block or frachead is attached to the wellhead or other tubular structures or fixtures located on the wellhead. Fluid lines from high pressure pumps are attached to the frachead and are capable of withstanding high pressures and are resistant to erosion from the abrasive sand.

A multitude of other surface equipment, such a remote ball launchers and ball catchers, can be operationally attached to the frachead. In order to increase operational safety and to provide finer operational control, each piece of surface equipment operational attached to the frachead can be isolated from one another by installing isolation valves therebetween. Further, the frachead itself can be isolated from the source of the fracturing fluids through isolation valves. Common isolation valves that can be used are gate valves.

As fracturing fluid is pumped at high pressures through the various surface wellhead equipment, the sand carried by the fracturing fluid can enter into various cavities in the valves and collect, stick, settle or otherwise remain trapped therein, resulting in sand packing.

Sand packing in the isolation valves can impede or prevent the isolation valve from properly, and fully, opening and closing. Improper closing of the isolation valves creates safety issues as the various pieces of equipment can remain in fluid communication at high pressures and prevent full isolation thereof, while improper opening of the isolation valves results in restriction of the bore diameter which can impact fluid pressures, rates therethrough and encourage erosion. In instances where a wellbore isolation valve is restricted, the restriction can also prevent larger diameter tools, such as balls or other downhole tools, from passing therethrough and blocking access to the downhole operations.

To remove sand packing in isolation valves, or replace compromised valves, fracturing operations have to be temporarily suspended or shut down which can lead to costly, non-productive downtime and potential operational difficulties including falling out and downhole deposition of otherwise flow-suspended sand, resulting in costly wellbore blockages.

SUMMARY

Applicant has identified several areas of gate valves that can be improved for minimizing sand-packing, or if packing is to occur, can be rectified without interruption of operations. Turning to various embodiments of the current valve, Applicant has a structured form of recess at the stem to bonnet interface or a bonnet inside surface gate stop, or both, that minimizes issues related to sand packing and, if sand packing occurs, provides arrangements for overcoming packing without taking the valve out of operation.

Arrangements at the bonnet and gate interface include providing profile and dimensional modification effective to minimize packing effects when stroking the gate to the retracted position. The gate to bonnet interface can comprise particular design of the bonnet's inside surface or design of the stem end of the gate.

In one aspect, a method for retrofitting a gate valve is provided for mitigation of sand packing comprising removing a bonnet, valve stem and gate from the gate valve, the bonnet having an inside surface in fluid communication with a main fluid bore for the passage of sand-bearing fluids, removing the valve stem from a shaft bore extending through the bonnet to the inside surface; and counterboring the shaft bore from the inside surface and extending into the bonnet therefrom to form a generally tapered annular recess about the shaft bore, the annular recess tapering inwardly to an apex, a first transverse extent of the annular recess at the inside surface being greater than that at the apex.

In another aspect, a bonnet for a gate valve is provided, the gate valve having a valve body, a reciprocating gate and a valve stem driveably connected to the gate. The bonnet comprises a shaft bore extending through the bonnet to access the valve body and adapted to receive the valve stem therethrough; an inside surface facing the gate and valve body; and a generally tapered annular recess countersunk into the inside surface about the shaft bore and tapering into the bonnet to an apex at the shaft bore, a first transverse extent of the annular recess at the inside surface greater than that at the apex.

In another aspect, a bonnet, gate and valve stem assembly for a gate valve is provided wherein the valve stem strokes axially between an extended and a retracted position. The gate has a proximal stem end opposing the inside surface of the bonnet, the inside surface being planar and the proximal stem end stops against the planar inside surface of the bonnet. The inside surface or stem end of the gate are modified to form a seat, sandwiched between beveled interfaces for displacing sand therefrom.

DESCRIPTION

Figure 1:
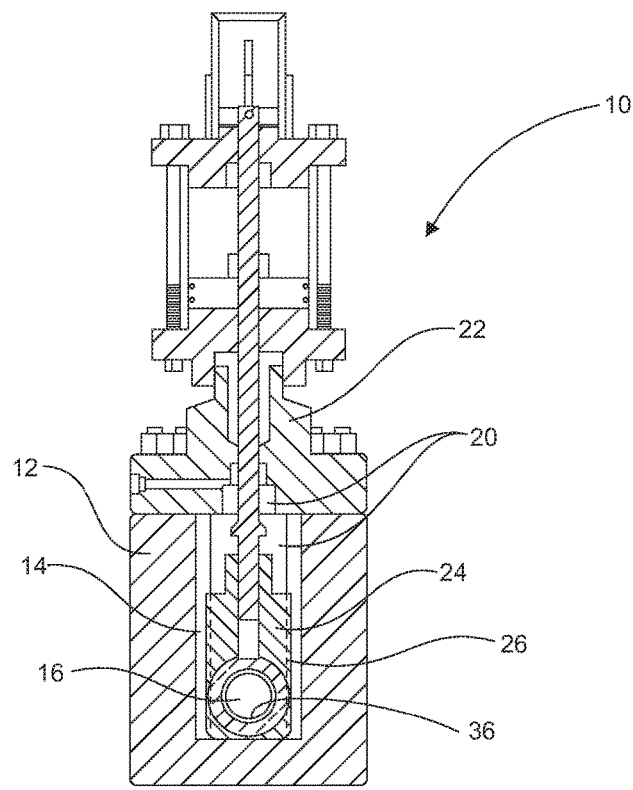
FIG. 1 is an inline or axial cross-sectional view of a prior art gate valve in its fully closed position.
Figure 2:
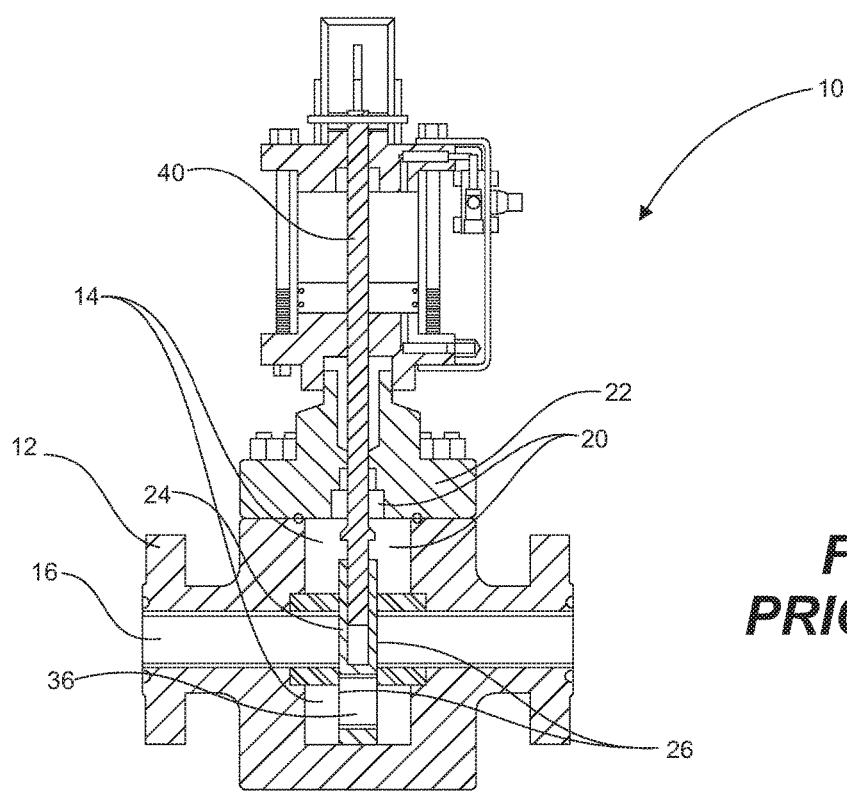
FIG. 2 is a side cross-section view of the prior art gate valve of FIG. 1.

With reference to FIGS. 1 to 4, a gate valve 10 generally comprises a flanged housing 12 for fluidly connecting to other wellhead equipment, such as fluid lines or piping, fracheads, ball launchers, and ball catchers. The housing 12 has a housing cavity 14 through which a main bore 16 extends to form part of a fluid flow path. The housing cavity 14 is also intersected by a valve access port or gate bore 20, typically at right-angles to the main bore 15. The gate bore 20 enables access for open/close components for operation of the valve. A bonnet 22 is sealably fit to the gate bore 20 and supports gate actuation components. A gate 24 is moveable within the gate bore 20 and along a gate guide 26 formed in the housing 12. The gate 26 moves between two positions for alternately closing and opening the main bore 16.

Figure 3:
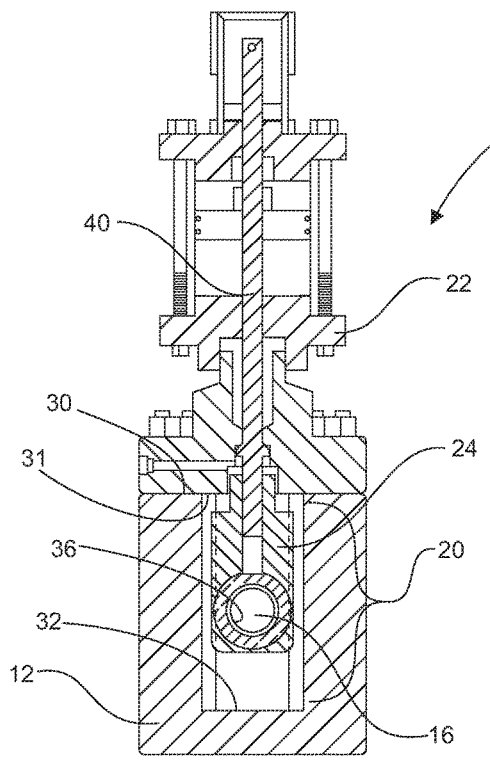
FIG. 3 is an cross-section view of the prior art gate valve of FIG. 1 in its fully opened position.
Figure 4:
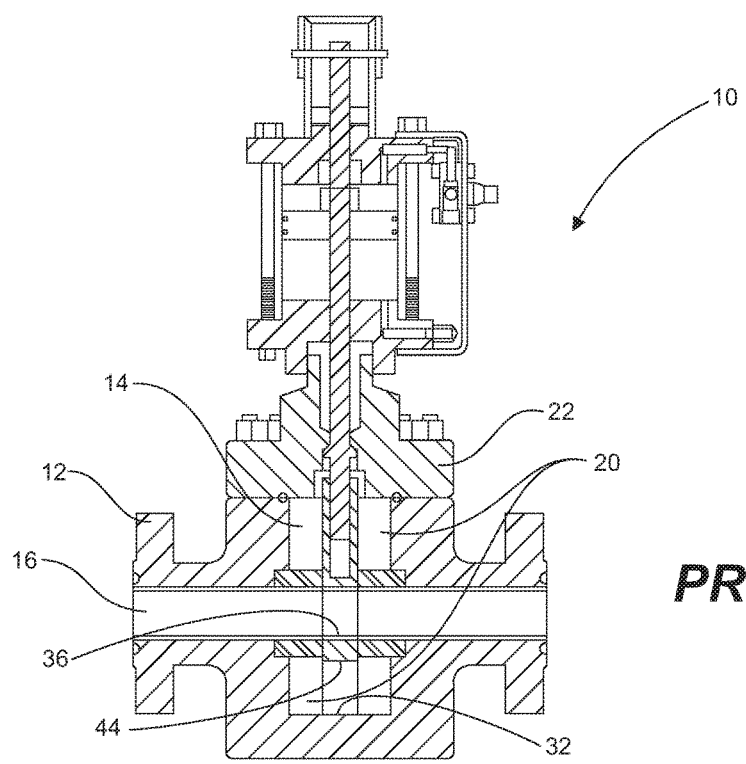
FIG. 4 is a cross-sectional view of the prior art gate valve of FIG. 2 in its fully opened position.

As shown in FIG. 3, the gate bore 20 extends from about a first wall 30 of the housing at the bonnet 22 to a second opposing wall 32 of the housing 12. An interface wall or inside surface 31 of the bonnet 22 is sealably secured to the first wall 30 of the housing 12. The gate bore 20 intersects the main bore 16, typically arranged perpendicularly thereto. The gate 24 comprises a slab-like plate having a port 36 formed therethrough that alternately aligns (FIGS. 3 and 4) or is misaligned (FIGS. 1 and 2) with the main bore 16 to operate the valve 10 between the opened and closed positions respectively. In the misaligned or closed position, the gate blocks fluid communication through the main bore. In the aligned or opened position, the gate permits fluid communication of fluid therethrough.

Figures 5A, 5B:
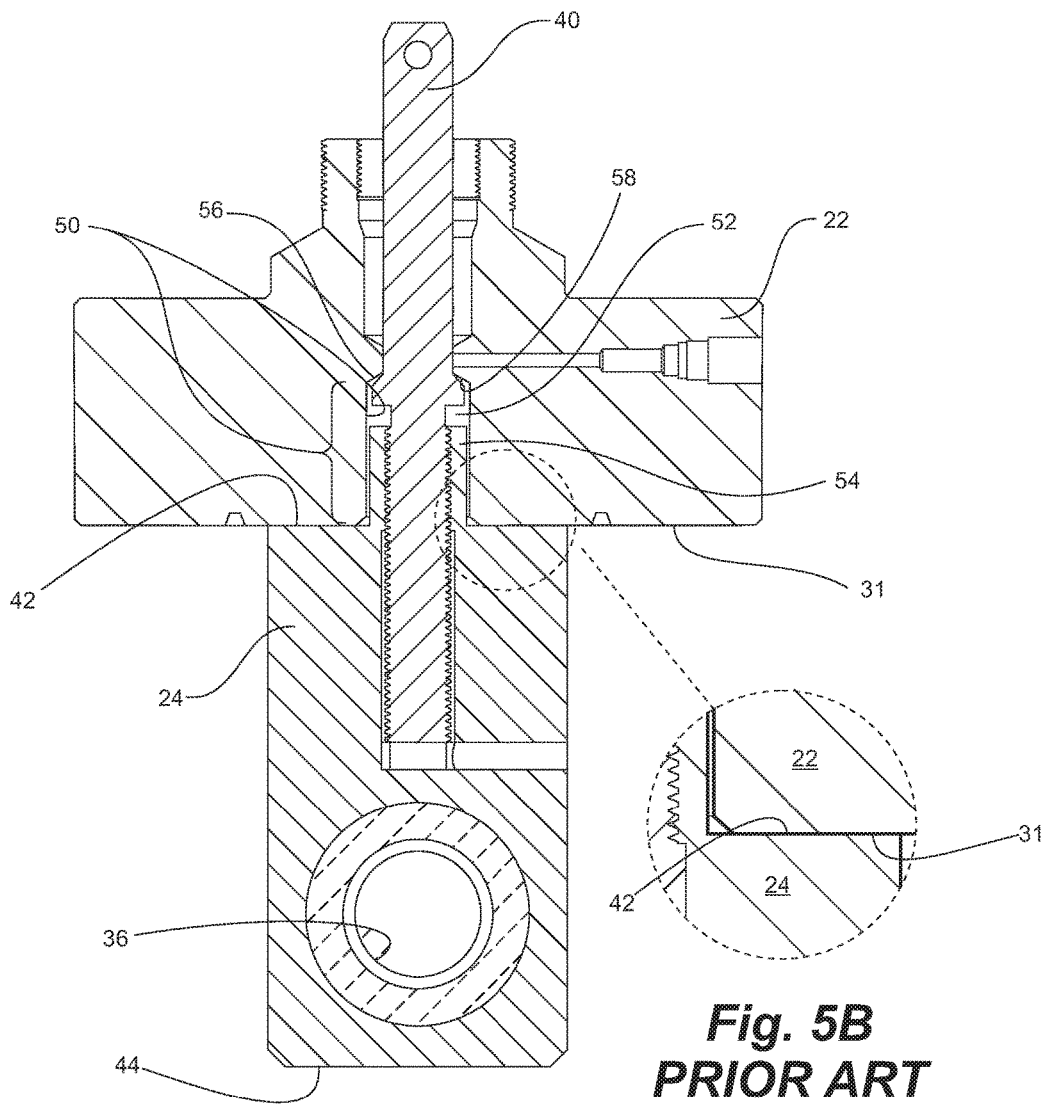
FIG. 5A is an axial cross-sectional view of the prior art gate valve of FIG. 1, illustrating a bonnet, a stem extending therethrough, the stem operatively connected to a sliding gate having an opening therethrough for the passage for fluids.
FIG. 5B is a close up view of the bonnet and gate interface of FIG. 5A.

With reference also to FIGS. 5A and 5B, the gate 24 is actuated through a shaft or stem 40 that is connected to the gate and axially driven through the bonnet 22 such as by screw or hydraulic actuation. In embodiments, the gate can be actuated mechanically by axially stroking the stem, such as by rotatable and threaded actuation. Alternatively, the gate 24 can be actuated hydraulically by attaching the stem to a hydraulically actuated piston, for linear actuation. The stem 40 extends sealably through the bonnet 22 and is actuated axially to controllably misalign the port 36 in the gate 24 with the main bore 16 and actuated in an opposite direction to cause the opening of the gate to align with the main bore. The gate has a slab-like profile, movable linearly within the gate bore. A gate typically has parallel rail and groove-like corresponding interfaces on the gate and housing for guiding the gate movement.

The stem 40 is connected to a first end or stem end of the gate. The stem and attached gate are actuated to move into and out of the housing 12, for convenience referred to up (top) and down (bottom), although the orientation of the gate valve is not necessarily vertical. Gate valves are also often oriented with the stem arranged horizontally or vertically.

Stroking operation of the valve stem, gate and gate port 36, whether upwardly to close the valve or downwardly-shifted, gate actuation position is delimited typically by some form of mechanical interaction or stop formed with the bonnet, referred to as the retracted position. As shown in FIGS. 1 to 4, alignment of the gate and main bore to open the valve 10 occurs when the stem is fully retracted into the bonnet. Delimiting of the gate position in the retracted position, to open the valve, precisely aligns the gate port and main bore, minimizing disruption of fluid flow and minimizes generation of conditions conducive to a worsening of erosive flow conditions.

In the arrangement of some prior art valves, the retracted position is delimited at least at one extent of movement by a stop formed between the stem and the bonnet. In FIG. 5A, the retracted position is delimited at least by a stop formed between a top shoulder or stem end 42 of the gate 24 and the inside surface 31 of the bonnet 22. Further, still illustrated by FIGS. 1-4, when the stem 40 is extended, the closed gate position can also be delimited, typically by interaction with the opposing housing wall 32.

As shown in the arrangement illustrated in FIGS. 5A and 5B, the gate 34 is delimited by mechanical interaction of the stem end 42 of the gate itself and the inside surface 31 of the bonnet 22. Upward movement of the stem 40 moves the gate upwardly towards the bonnet. The stem end 42 or first end of the gate 24 engages the bonnet 22. Similarly, downward movement of the gate 24 can be delimited by bottoming out or engaging a second end of the gate 44 with the opposing wall 32 of the housing 12, opposing the bonnet 22.

For valve sealing, erosion and maintenance considerations the housing is typically fit with cylindrical inserts, aligned with and forming the main bore, and spaced apart to straddle the gate, forming a gate guide, and having corresponding thicknesses to slidably receive the gate therebetween. Accordingly, extended or downward movement of the gate can alternatively be delimited by pinching the thickness of a tapered gate between opposing sealing interfaces of the cylindrical inserts. Practically, and for movement of the gate 36 between open and closed positions, sealing of the gate and the inserts is not absolute and fluid-borne particulate can enter the gate bore.

Such gate valves are typically used in the prior art, including for the control of fluids having particulates therein.

The general structure of valves 10 having been described above, there are various challenges to operations with sand-laden fluids. As disclosed above, as fluid passes through the main bore 16, sand in the fluid can also enter, stagnate or collect in the housing cavity 14 and gate bore 20 including at the inside surface 31 of the bonnet 22. Sand accumulation can interfere with gate operation often referred to in the industry as sand packing. Applicant notes that sand packing can occur particularly where the stem 40 extends from the bonnet 22. More particularly, sand packing is exacerbated at a recess 50 located at the interface of the valve stem and bonnet. Further, sand can pack along the stem end 42 of the gate 24 and the bonnet's inside surface. For description purposes herein the top shoulder or stem end of the gate is adjacent the bonnet 22 regardless of valve orientation. Sand packing interferes with gate operation. Also, sand can also pack along a bottom 44 of the gate 24 adjacent the housing's second wall 32.

Returning to the prior art arrangement of FIG. 5A, the stem 40 extends through a shaft bore 52 in the bonnet 22. At the inside surface 31 of the bonnet, at the interface of the bonnet and gate bore, the stem 40 emerges through stem recess 50. The stem recess 50 is an annular recess formed between the stem 40 and the bonnet 22. The conventional recess 50 is generally cylindrical. Further, in some conventional valves, the recess 50 forms a corresponding gate guide for the gate's guide boss 54 extending upwardly from the stem end 42 of the gate 24. The recess 50 is vulnerable and prone to collecting sand along the stem 40 and along the top portion or shoulder 42, packing between the bonnet and the gate guide boss 54.

With the gate 24 in the retracted position, sand packing in the recess 50 can jam or otherwise interfere with actuation of the stem 40 or gate 24 as the stem and guide boss 54 are actuated to retract into the bonnet 22. In the illustrated embodiment, in which retraction into the bonnet opens the gate, sand packing results in only a partial opening of the gate 24. Accordingly, sand packing interferes or impedes the actuation of the stem and gate. Another area of difficulty exists at upset, stop or shoulder on many forms of the stem 40. A stem shoulder 56 that engages a recess shoulder 58 in the recess can exacerbate sand packing and gate jamming. The shoulder 58 is often provided as a stem-sealing backstop, so as to permit the servicing of conventional replaceable packing on the low pressure or topside of the stem 40.

An extra turn or two of a threated actuation, or added axial force on the stem, forms a metal-to-metal seal at the shoulder and bonnet interface. This interface is also subject to sand packing interference and can compromise the seal or gate operation.

Sand Mitigation

Figure 6A:
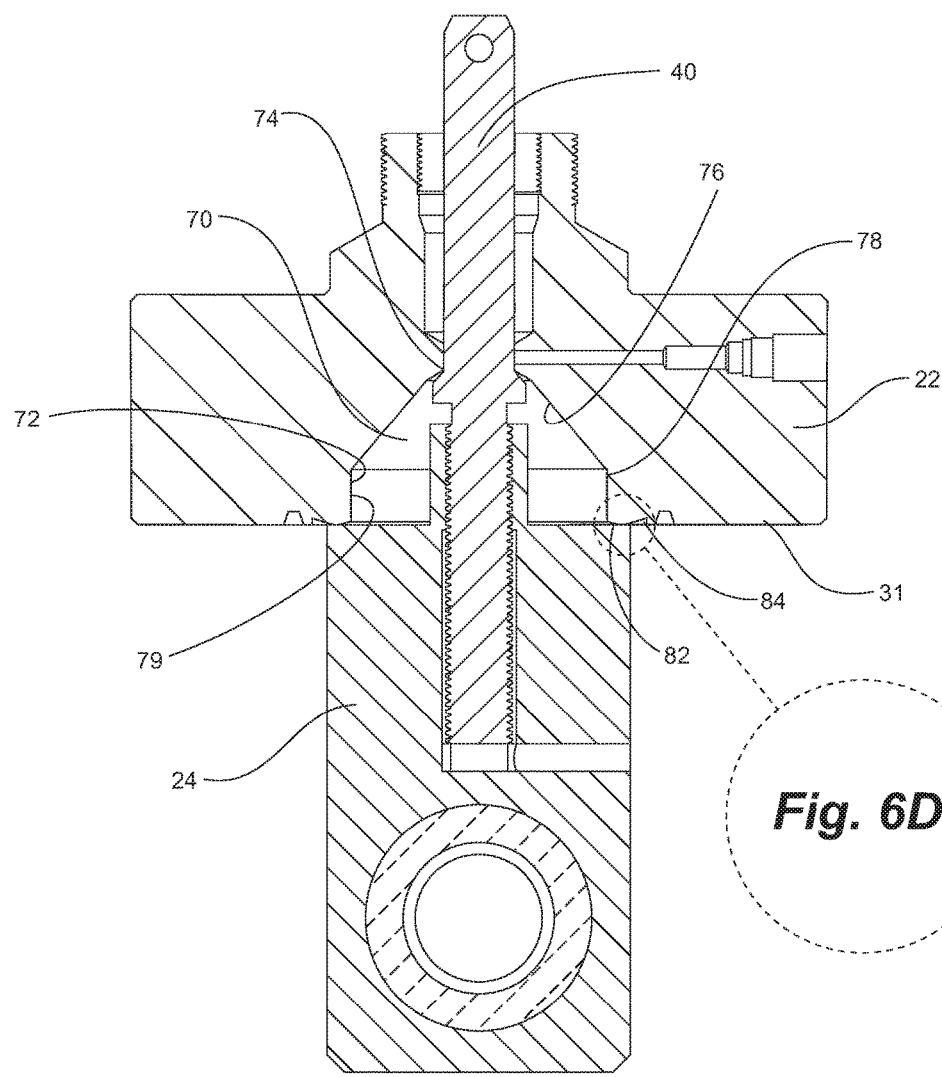
FIG. 6A is an axial cross-sectional view of an embodiment of the present invention, illustrating a bonnet and a stem extending therethrough, the stem operatively connected to a sliding gate, the bonnet stem interface being design for to mitigate against sand packing, and a balloon noting reference to an enlarged view shown on FIG. 6D.

Turning to various embodiments of the current valve, and with reference to FIG. 6A, Applicant has a structured form of recess at the stem to bonnet interface or a bonnet inside surface gate stop, or both, that minimize issues related to sand packing and, if sand packing occurs, provides arrangements for overcoming packing without taking the valve out of operation.

Figure 6B:
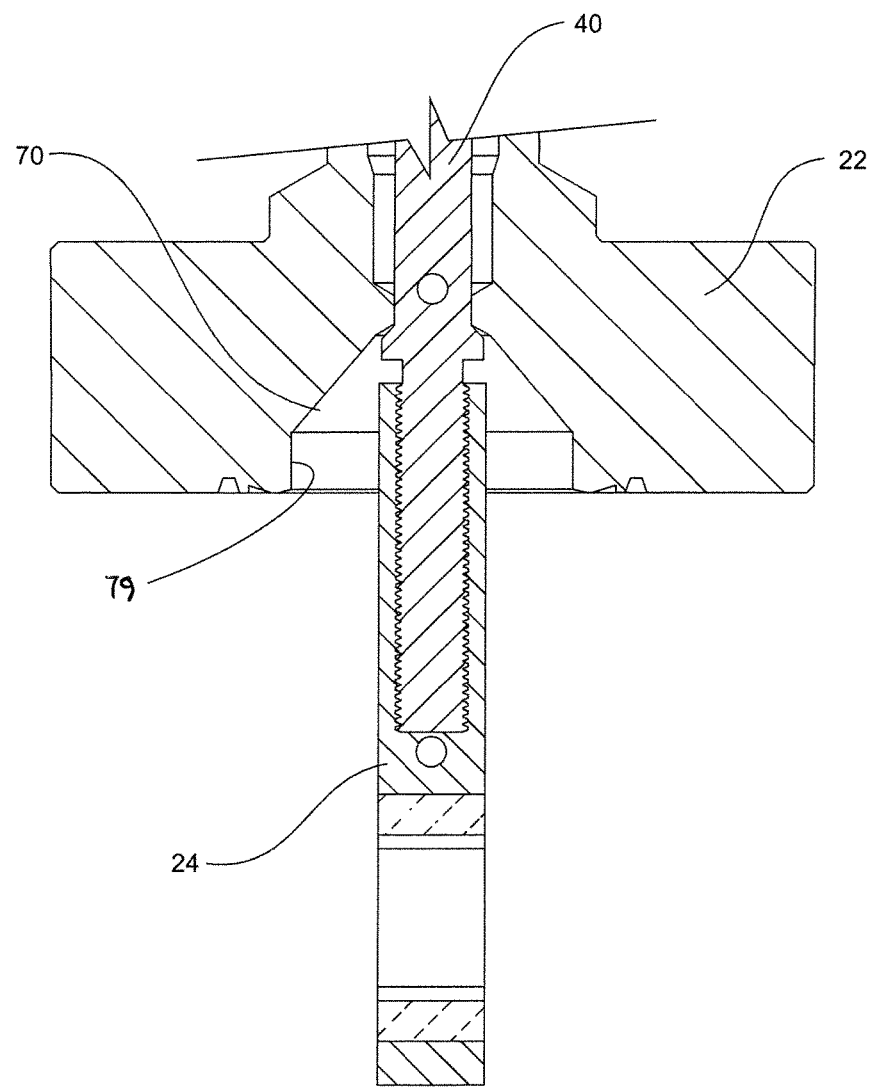
FIG. 6B is a side cross-sectional view of the embodiment of FIG. 6A illustrating sand relief areas straddling the gate.
Figure 6C:
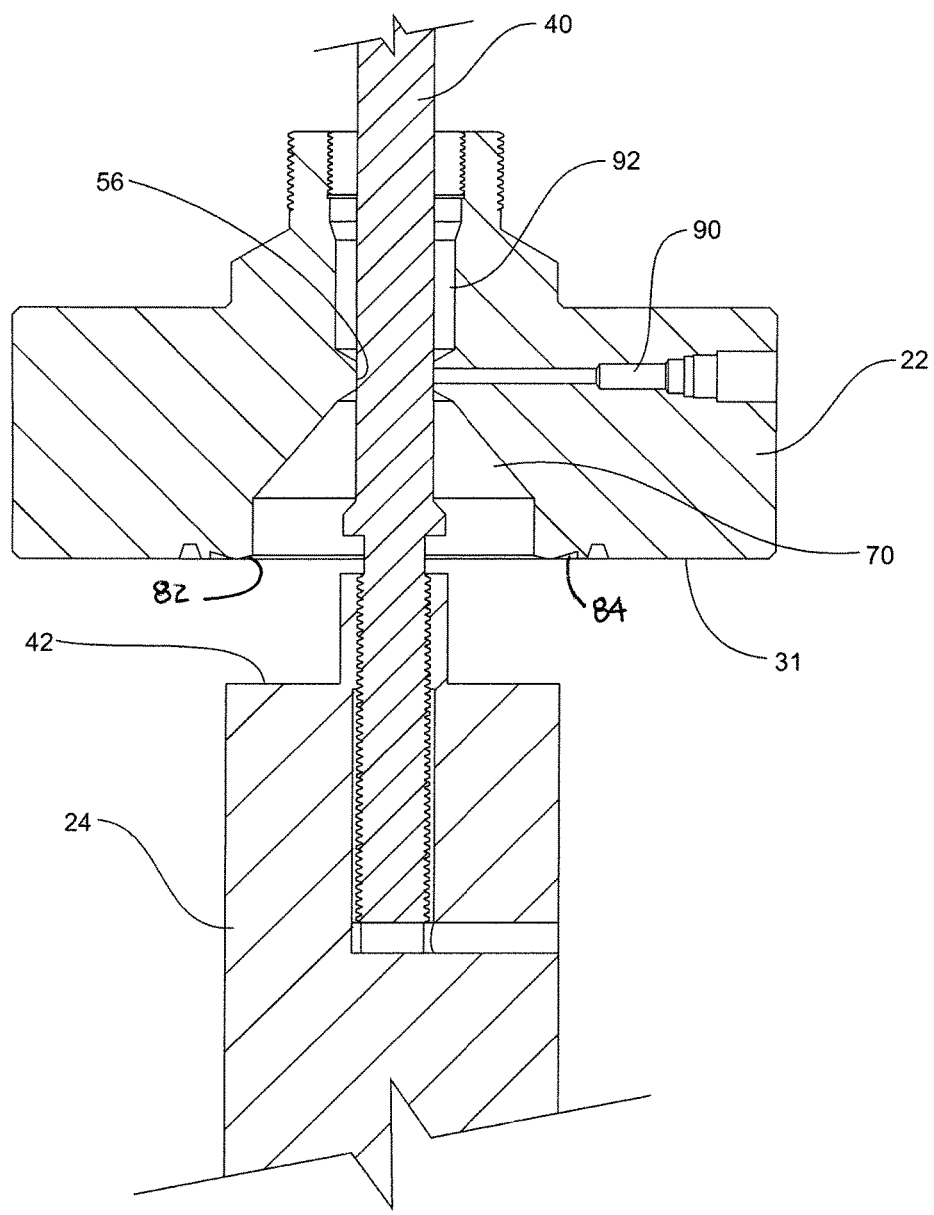
FIG. 6C is an axial cross-sectional view of the embodiment of FIG. 6A illustrating the sliding gate in the extended, closed position.
Figure 6D:
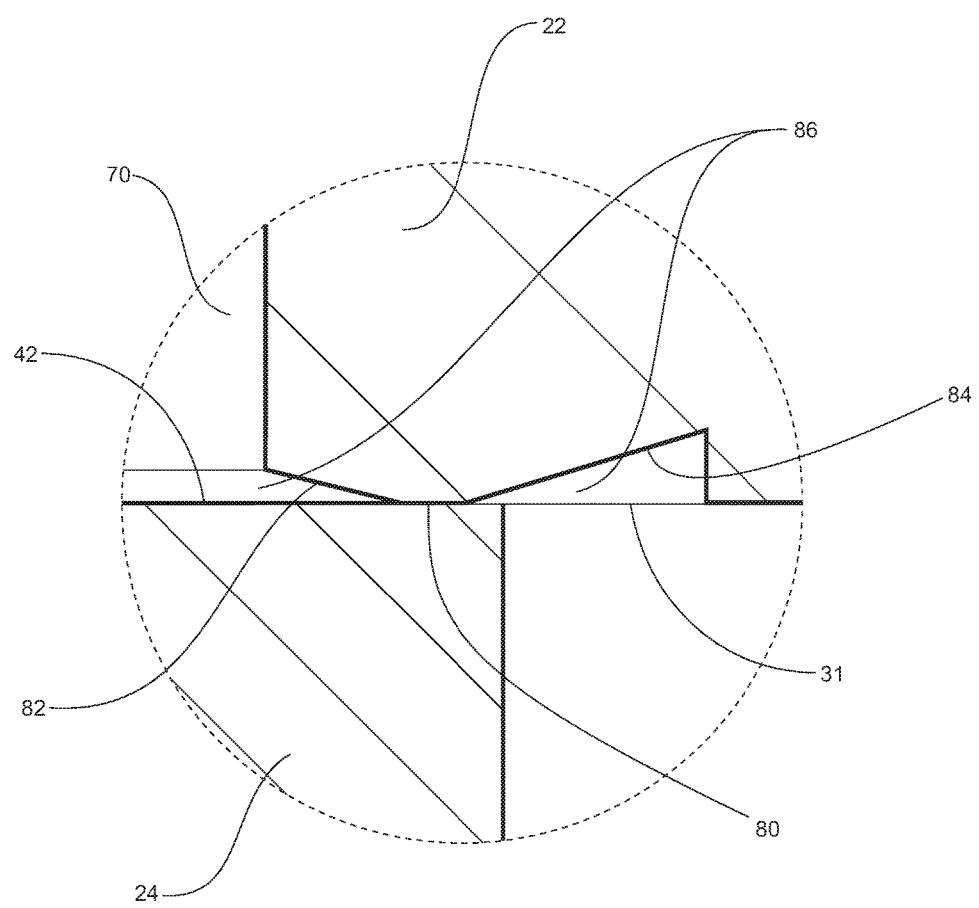
FIG. 6D is an enlarged view of the bonnet and gate interface of FIG. 6A.

Arrangements at the bonnet and gate interface, include providing profile and dimensional modification effective to minimize packing effects when stroking the gate to the retracted position. Such profile and dimensional modifications are provided at the stem and bonnet interface, such as various arrangements illustrated in FIGS. 6B, 6E and 6F, and at the gate to bonnet interface, such as various arrangements illustrated in FIGS. 6D and 12B. The gate to bonnet interface can comprise particular design of the bonnet's inside surface as shown in FIG. 6D or design of the stem end of the gate as shown in FIG. 12B.

Figure 6E:
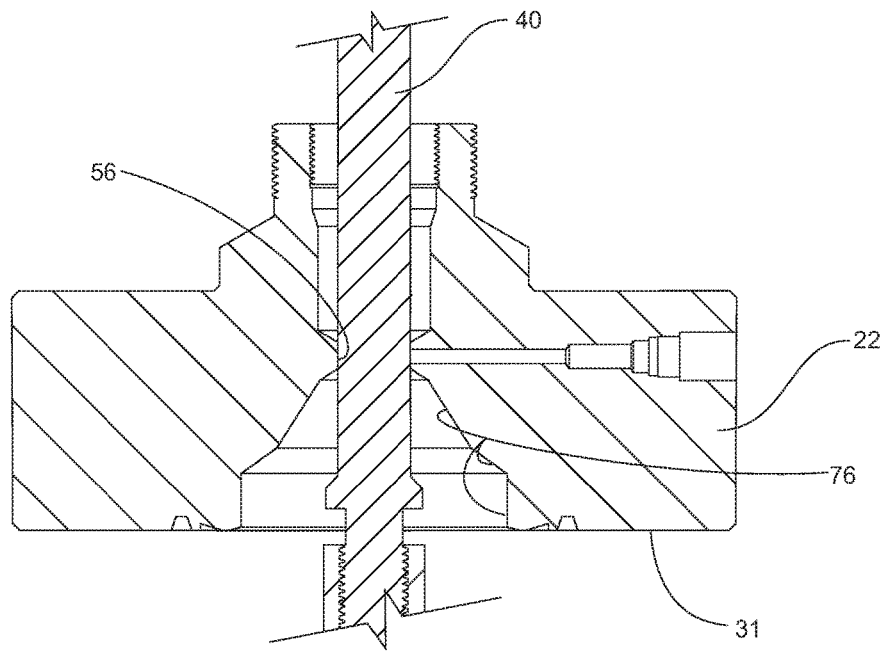
FIG. 6E is a side cross-sectional view of an embodiment of a bonnet having a staged conical recess.
Figure 6F:
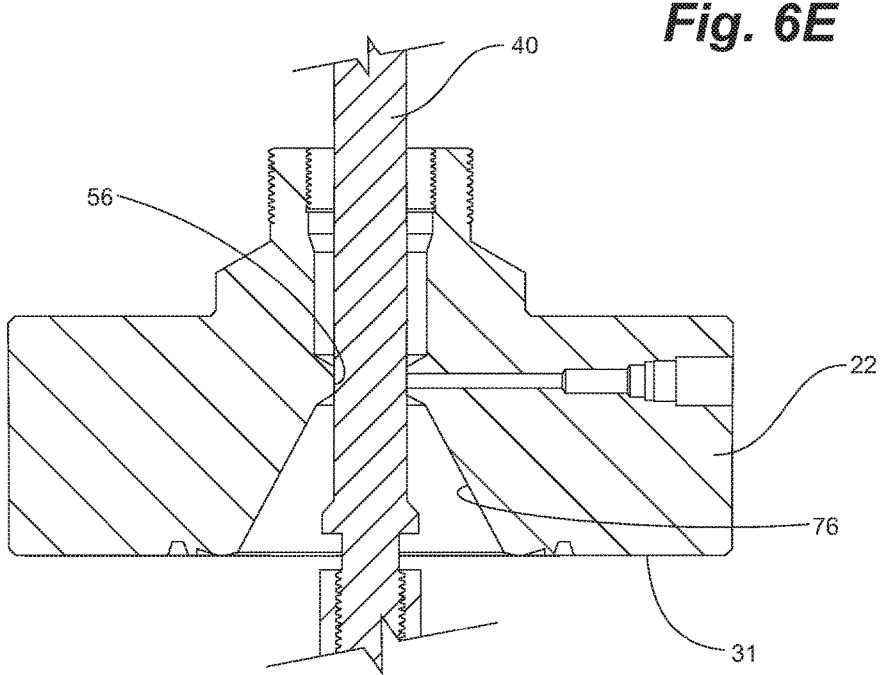
FIG. 6F is a side cross-sectional view of an embodiment of a bonnet having a conical recess and no cylindrical portion.

As introduced above, the annular recess 70 can have a single geometry or combined geometries to form the annular opening amenable for the release of accumulated or packed sand back to the valve environment. The profile 76 of the walls of a conical recess can extend from the inside surface 31 or from one or more inside profile interfaces. In one embodiment, as shown in FIG. 6F, the recess embodies aspects of a simple, right conical volume or recess. In another embodiment, shown in FIGS. 6A and 6B, the recess 70 is multi-part volume comprising forming a first recess extending cylindrically into the bonnet from the inside surface 31 and terminating at a first internal interface and then a second recess extending into the bonnet from the first internal interface and tapering inwardly to the apex. The further recess can be conical. As shown in FIG. 6E, a first, conical recess can extend from the first internal interface comprising the upper end 78 of a cylindrical counterbore 79 and a second, conical recess is initiated from the truncated apex of the first conical recess. Thus, the profile 76 can include a combination of a cylindrical portion and two or more conical recesses of different slopes. In an embodiment shown in FIG. 6E, the first, conical recess can extend at about 40 degrees form the stem axis and the second, conical recess at about 25 degrees. The backseal shoulder or stop 56 is typically formed at about 60 degrees.

In an embodiment, the bonnet inside surface 31 is modified to minimize any sand packing that could affect retraction of the gate 24. Further, the prior art shaft bore about the stem is enlarged to first resist sand packing, and should sand accumulation occur, to facilitate passive self-cleaning or active displacement or to render the sand packing ineffective to interfere with gate operations.

In one embodiment, the sand packing-resistant annular recess 70 is provided about the shaft bore between the stem 40 and the main body or structure of the bonnet 22. The valve stem 40 comprises a first portion which extends through the shaft bore 56 for support in the bonnet 22 and a second portion which extends into the gate cavity. In an embodiment the annular recess 70 tapers into the bonnet and radially inwardly to an apex 74, a first transverse extent of the annular recess at the inside surface 31 has a dimension greater than that at the apex 74 for forming an enlarged release volume and surface from which sand is less likely to accumulate. The radial dimension of the apex 74 can have a transverse extent of that of the shaft bore 56.

The recess 70 has walls having a profile 76 that are wide at the inside surface 31 and narrow within the bonnet 22 to the shaft bore 56. As shown in FIG. 6A, a recess is shown having a profile that is being generally tapered from a maximal diametral extent 72 at the bonnet's inside surface 31 to a narrower apex 74. The tapered profile is generally conical, narrowing to a right-truncated apex 74 within the bonnet 22, the apex being spaced upwardly from the inner surface 31 and located along the shaft bore 56. A conventional gate 36 can be employed, the conical recess 70 either remaining unobstructed by all but the stem 40, or sized also to receive a protruding gate guide boss 54 with the conical recess 70 having a transverse extent greater than that of boss 54, even in the retracted state.

The sloped walls of the profile 76 firstly widen the annular recess about the stem and further resist sand accumulation. The profile diverges from adjacent surfaces including the stem or the gate boss when present. Further, as the walls of the profile 76 are non-orthogonal, the profile aids in shedding of sand in both vertical and horizontal stem arrangements. An example of the extent to which the recess is enlarged may be represented by conical embodiments in which the diverging walls are angled outwardly from the apex at about 20 to 60 degrees from the stem axis.

Applicant has found that the created additional space and relief surfaces reduce the tendency for sand to collect or stagnate at, in and about the inside surface of the bonnet, reducing or eliminating sand packing. A comparison of prior art arrangements of FIG. 5A and the current embodiment of FIG. 6A better illustrate the modifications on the bonnet for adding the annular recess and stop interfaces. Further, the modified annular recess further aids operation of stems 40 integrating a back-seal stop, such arrangements now being less inclined to interfere with opening as any packed sand can be displaced to and through the modified annular recess.

In embodiments, the bonnet is counterbored about the stem's shaft bore to create the annular recess 70 such as that shown in FIGS. 6A, 6B, 6E and 6F. The troublesome prior art cylindrical annular space between shaft bore and stem is modified by counterboring the bonnet 22 to include a generally tapered annular profile or recess 70, shown here as one or more forms of truncated right cone.

With the gate 24 in the retracted position, as shown, sand accumulation is minimized with wide and diverging exit paths formed from apex to the interface. As the gate is generally two-dimensional, having thickness being thin (FIG. 6B) compared to the gate's width across the slab (FIG. 6A), and the recess has a three-dimensional extent, sand can exit the recess 70 through the remaining recess passages formed adjacent the open and opposing slab faces.

Thus, as the gate 24 retracts to the bonnet 22, even if sand accumulation occurs, it is easily displaced radially from the stem and even permitted to flow through the open recess passages. Further, the diverging walls of the recess at the apex further overcome the difficulty of accumulation at the stop at the stem shoulder 56 and recess shoulder 58.

Figure 7A:
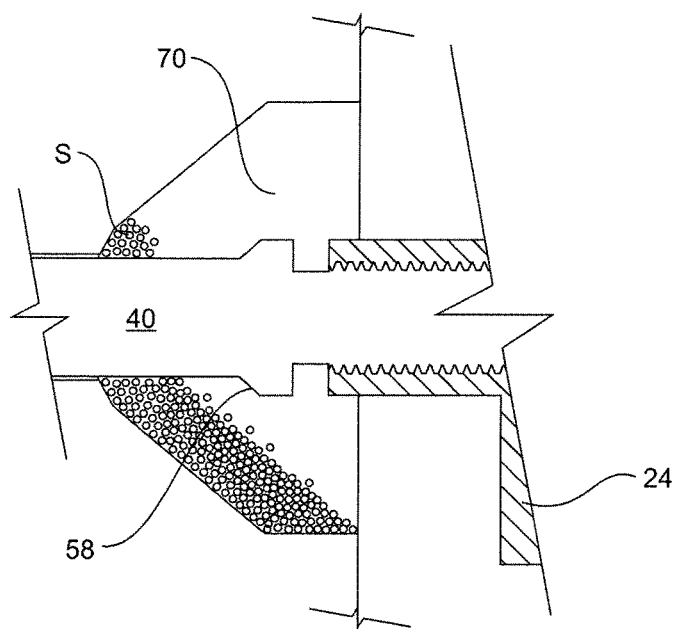
FIGS. 7A and 7B are fanciful partial cross-sectional views of a gate valve oriented with the stem arranged horizontally, the bonnet recess illustrating sand collection and shedding at about the recess apex before and after stem actuation.
Figure 7B:
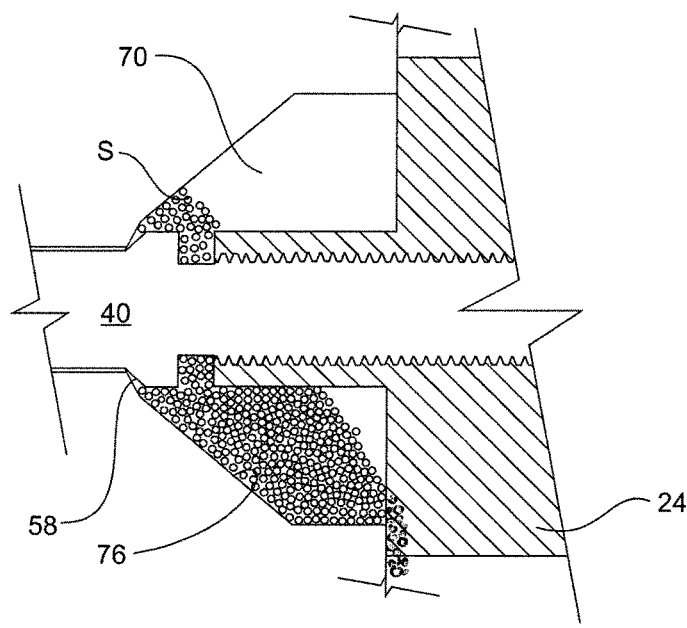
Figure 8A:
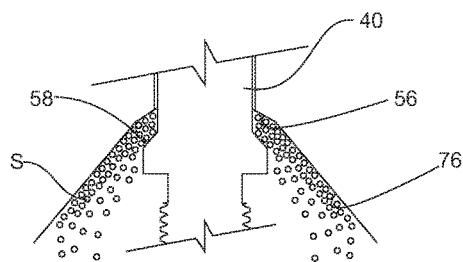
FIGS. 8A and 8B are fanciful partial cross-sectional views of a gate valve oriented with the stem arranged vertically, the bonnet recess illustrating sand collection and shedding at about the recess apex before and after stem actuation.
Figure 8B:
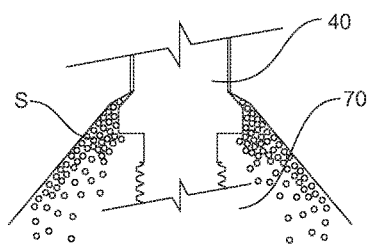
Figure 9A:
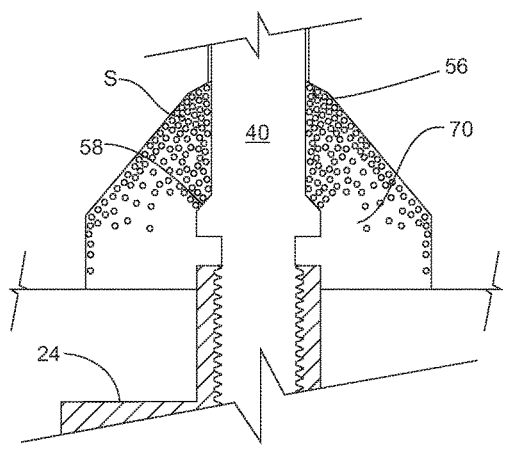
FIGS. 9A and 9B are fanciful partial cross-sectional views of a gate valve oriented with the stem arranged vertically, the bonnet recess illustrating sand collection and shedding therein before and after stem actuation of a gate having a guide boss extending into the recess.
Figure 9B:
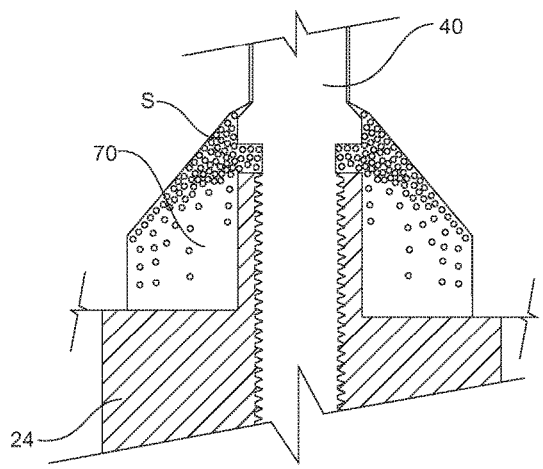
Figure 10C:
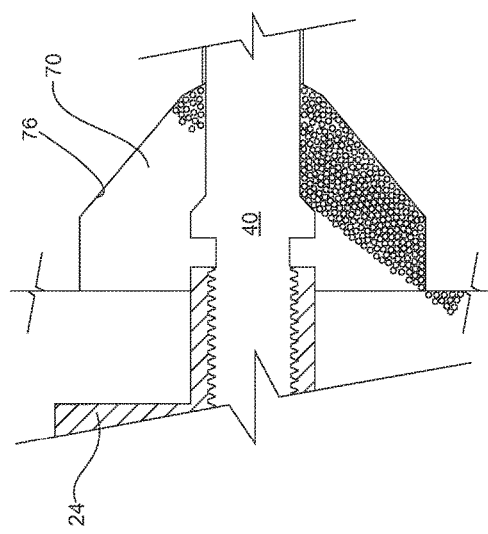
FIGS. 10A, 10B and 10C are fanciful partial cross-sectional views respectively of a gate valve oriented with the stem arranged horizontally for retraction of the gate to the left, rotated with the stem arranged vertically for retraction of the gate upwardly, and lastly the stem arranged horizontally for retraction of the gate to the right.
Figure 10B:
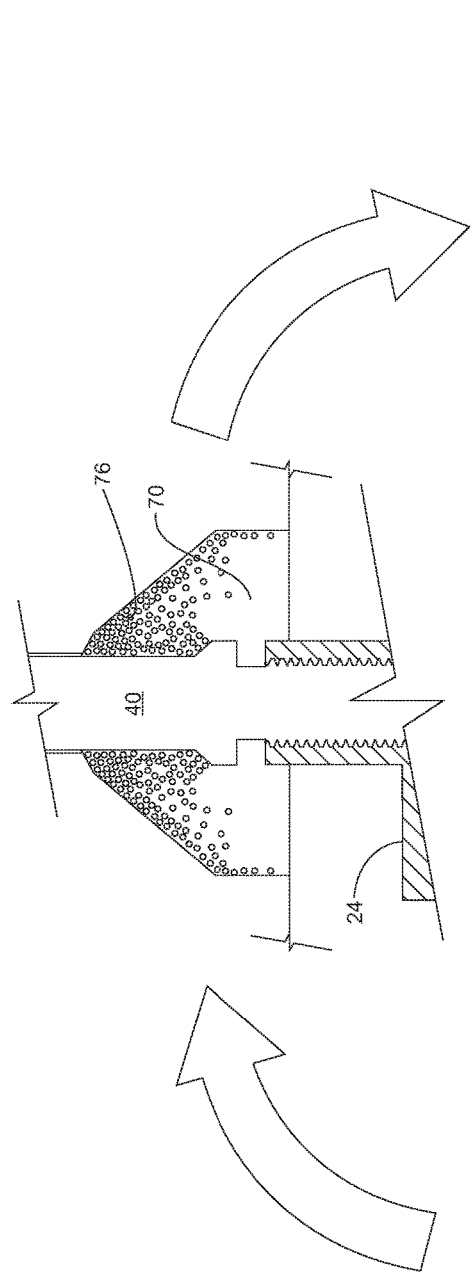
Figure 10A:
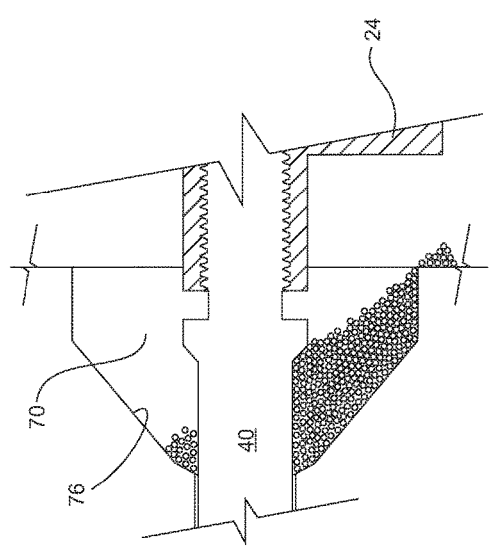

As shown in FIGS. 7A and 7B, accumulation of sand S is shown shedding at about the recess apex before and after actuation of the stem 40. As shown in FIGS. 8A and 8B sand S (FIG. 8A) can be displaced and shed (FIG. 8B) after stem actuation of the gate 24 including a gate having a guide boss 54 extending into the recess 70.

As shown in FIGS. 6A and 6D and FIGS. 11A and 11B, in an embodiment, a circumferential portion of the recess at the bonnet inside surface 31 comprises a gate stop for engaging the top surface, proximal or stem end of the gate. The gate stop can be created by forming an annular shoulder or seat 80, located radially between first and second beveled surfaces, about a circumferential edge of the cavity. The first and second beveled surfaces 82, 84 serve to direct any packed sand (FIG. 11B) along the stem end 42 of the gate 24 away from the stop-engaging surfaces between a bottom or inside surface 31 of the bonnet 22 and the stem end 42 of the gate, permitting gate to fully engage the gate stop and ensure reliable positioning of the gate 24 and port upon retraction. In the embodiment shown, for a transverse extent at the inside surface of about 5.25 inches, in a bonnet of overall diameter in the order of 14-15 inches, the first and second beveled surfaces 82, 84 have a depth into the bonnet of about 0.125 inches. To form a depth of 0.125 inches, the inside or first beveled surface is at about 45 degrees and the second beveled surface can have a low angle in the order of about 5-8 degrees.

Figure 11A:
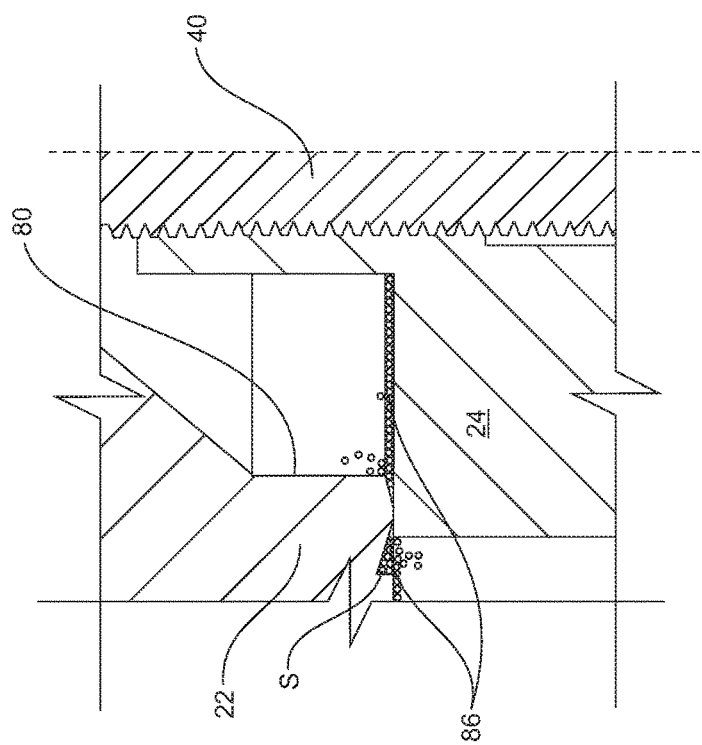
FIGS. 11A and 11B are fanciful partial cross-sectional views of the bonnet and gate interface with sand collection thereat before and after actuation of a gate with sand displacement from the interface.
Figure 11B:
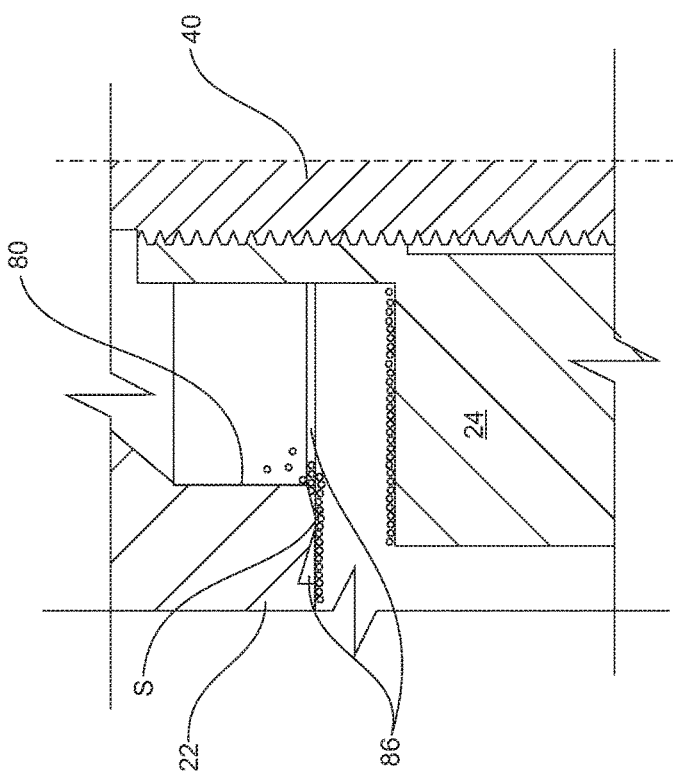

FIGS. 11A and 11B illustrate collection of sand S at the bonnet 22 and stem end 42 of the gate 24 before and after actuation of the gate, accumulated sand S being displaced from the seat area upon retraction.

Figure 12A:
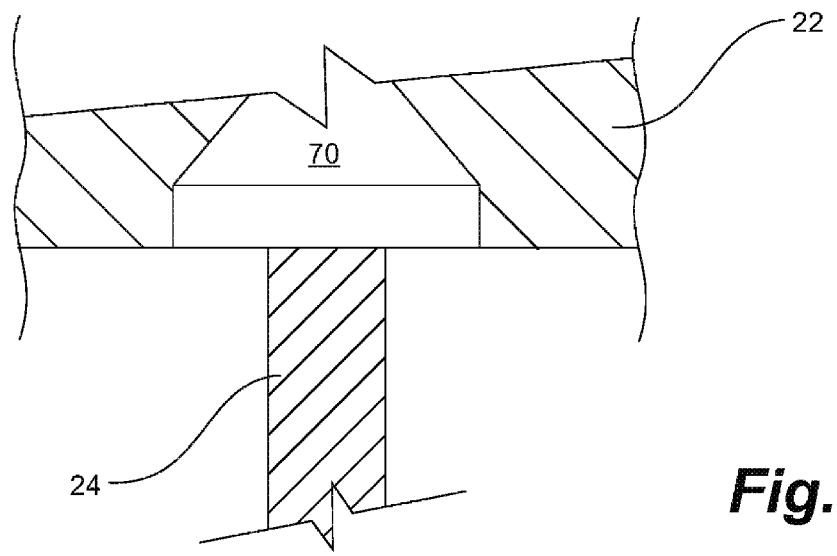
FIG. 12A is a side and partial cross-sectional view of a bonnet having an annular recess, and a planar gate interface to the inside surface.
Figure 12B:
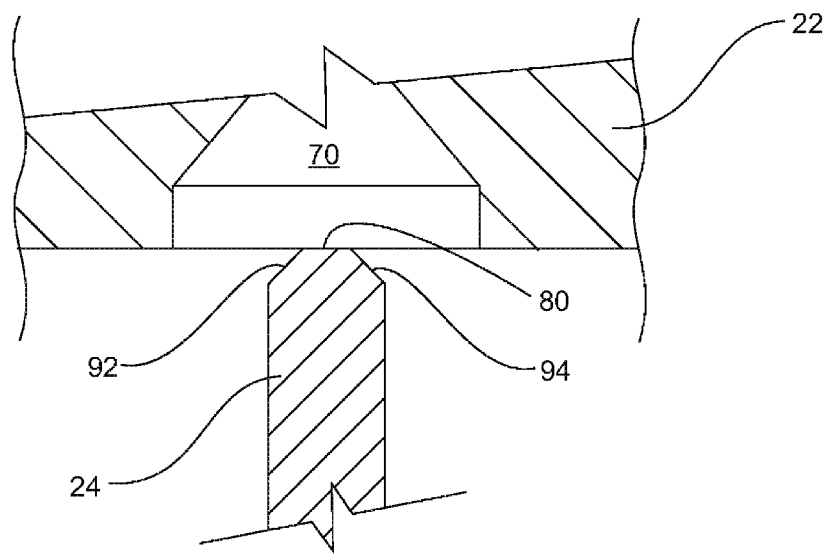
FIG. 12B is a side and partial cross-sectional view of an embodiment of profiled stem end of the gate for forming a bonnet and gate interface at the bonnet's inside surface for displacing accumulated sand.

Similarly, and with reference to FIG. 12B, the stem end 42 of the gate can be modified from the planar gate interface of FIG. 12A. The resulting seat 80 aids in displacing sand therefrom and ensuring reliable gate positioning on retraction. Beveled shoulders 92 and 94, as in the case of FIG. 6D serve to direct any packed sand away from the seat 80. The first beveled interface 92 is formed along one side of the proximal stem end of the gate; and the second beveled interface 94 is formed along the opposing side of the proximal stem end of the gate for forming a linear seat 80 along the proximal stem end between the first and second beveled surfaces 92,94. The linear seat 80 stops against the bonnet's inside surface 31.

Further still, in another embodiment and with reference back to FIG. 6C, lubricant can be injected into the stem area for displacement of sand accumulation. Applicant has found that the injected lubricant mixes or displaces the accumulated sand and, in combination with the tapered annular recess 70, assists in the removal of the sand from about the stem and a top of the gate. As shown, the lubricant can be injected into the cavity through lubrication ports 90 into the shaft bore for the stem. A shaft seal 92 is located within the shaft bore 56 within the bonnet 22 and the lubrication port 90 is located intermediate the shaft seal 92 and the annular recess 70. Injected lubricant is in fluid communication with the recess 70 along the shaft bore 56. Lubricant displaces sand from the shaft bore and lifts sand from the annular recess about the stem, releasing sand packing into the valve gate or main bore area.

In another embodiment, a method for retrofitting a gate valve is provided wherein a prior art valve can be modified to more consistently operate despite sand-laden fluid conditions. The bonnet 22 can be modified to provide one or more of the tapered annular recess 70 about the valve stem and a sand-rejecting gate stop 80. One can modify a conventional gate valve 10 (FIGS. 1 to 5B), first removing the bonnet 22 from the valve body 12 and then removing the valve stem 40 and gate 24 from the bonnet 22. The valve stem and gate are usually removed once the bonnet is separated from the valve body. The inside surface 13 of the bonnet is in fluid communication with a main fluid bore for the passage of sand-laden or bearing fluids and thus is subject to the accumulation and packing of sand. If not already disassembled, the valve stem 40 is removed from the shaft bore 56 extending through the bonnet 22 to the inside surface 31 and connected gate 24. The inside surface 31 is counterbored about the shaft bore 56 from the inside surface 31 and extending into the bonnet 22. The resulting counterbore forms a generally tapered annular recess 70 to enlarge the shaft bore 56.

Further, as set forth above, and as shown in FIG. 6D, a gate stop can be created by forming seat 80 in the inside surface of the bonnet. At least one of or both of the first and second beveled surfaces 82, 84 can be formed in the inside surface for directing any packed sand away from the stop-engaging surfaces between the inside surface 31 and the gate 24, permitting gate to fully engage the gate stop and ensure reliable positioning of the gate 24 and port upon retraction. Similarly, and with reference to FIG. 12B, the stem end 42 of the gate can be modified to form seat 80. Beveled shoulders 92 and 94 direct any packed sand away from the seat 80.

The embodiments of the invention for which an exclusive property or privilege is claimed are defined as follows:

1. A method for retrofitting a gate valve for mitigation of sand packing comprising:
   removing a bonnet, valve stem and gate from the gate valve, the bonnet having an inside surface in fluid communication with a main fluid bore for the passage of sand-bearing fluids, wherein a stem end of the gate stops against the inside surface of the bonnet;
   removing the valve stem from a shaft bore extending through the bonnet to the inside surface;
   counterboring the shaft bore from the inside surface and extending into the bonnet therefrom to form a generally tapered annular recess about the shaft bore, the annular recess tapering inwardly to an apex, a first transverse extent of the annular recess at the inside surface being greater than that at the apex;
   forming a first beveled interface at the inside surface at and about the shaft bore; and
   forming a second beveled interface spaced radially outward from the first beveled interface forming an annular stop-engaging surface for the stem end about the inside surface between the first and second beveled interfaces.

2. The method of claim 1 wherein the counterboring step to form a generally tapered annular recess further comprises:
   forming a conical recess extending into the bonnet from the inside surface and tapering inwardly to the apex.

3. The method of claim 1 wherein the counterboring step to form a generally tapered annular recess further comprises:
   forming a first recess extending cylindrically into the bonnet from the inside surface and terminating at a first internal interface; and
   forming at least a second, conical recess extending into the bonnet from the first internal interface and tapering inwardly to the apex.

4. The method of claim 1 comprising:
   forming a first beveled interface along a width of, and on one side of, the stem end of the gate; and
   forming a second beveled interface along the width of, and on an opposing side of, the stem end of the gate for forming a linear seat along the stem end between the first and second beveled interfaces.

5. A gate valve comprising:
   a valve body, a reciprocating gate and a valve stem driveably connected to the gate for stroking a stem end of the gate between an extended and a retracted position, the bonnet further comprising:
   a shaft bore extending through the bonnet to access the valve body and adapted to receive the valve stem therethrough;
   a planar inside surface facing the gate and valve body;
   a generally tapered annular recess countersunk into the inside surface about the shaft bore and tapering into the bonnet to an apex at the shaft bore, a first transverse extent of the annular recess at the inside surface greater than that at the apex;
   a first beveled interface formed at the inside surface and the annular recess; and
   a second beveled interface spaced radially outward from the first beveled interface for forming an annular seat about the planar inside surface between the first and second beveled interfaces forming an annular stop-engaging surface for the stem end of the gate in the retracted position.

6. The gate valve of claim 5, wherein the annular recess includes at least a conical recess extending from the inside surface to the apex.

7. The gate valve of claim 5 wherein the annular recess includes at least a cylindrical portion.

8. The gate valve of claim 5, wherein the annular recess includes a cylindrical recess extending from the inside surface and at least a first conical recess extending from the cylindrical recess to the apex.

9. The gate valve of claim 5 comprising:
   a first beveled interface formed along the width of, and on one side of the thickness of, the stem end of the gate; and
   a second beveled interface formed along the width of, and on the opposing side of the thickness of, the stem end of the gate for forming a linear seat for the stem end and the bonnet's inside surface.

10. The gate valve of claim 5, wherein:
    in the retracted position, the stem end of the gate directs packed sand from the annular stop-engaging surface into the first beveled interface, the second beveled interface, or both.

11. The gate valve of claim 10, wherein:
    the width of the stem end of the gate has a first radial extent;
    the second beveled interface has a second radial extent; and
    the first radial extent is less than the radial extent for directing any packed sand from the stop-engaging surface into and out of the second beveled interface.

* * * * *